Oct. 20, 1964   W. E. MILLER   3,153,371
DELAYED PRESSURE LOADING FOR GEAR MOTORS
Filed Nov. 20, 1961

INVENTOR.
WENDELL E. MILLER
BY
ATTORNEY

United States Patent Office 3,153,371
Patented Oct. 20, 1964

3,153,371
DELAYED PRESSURE LOADING FOR
GEAR MOTORS
Wendell E. Miller, Hutchinson, Kans., assignor to The Cessna Aircraft Company, Wichita, Kans., a corporation of Kansas
Filed Nov. 20, 1961, Ser. No. 153,412
8 Claims. (Cl. 91—87)

This invention relates generally to gear motors employing pressure loaded bushings or plates which are urged into sealing engagement against the faces of the rotating gears to thereby decrease fluid leakage and increase the volumetric efficiency of the motor.

The conventional manner of utilizing fluid pressure to urge the sealing bushing or plate into sealing engagement with the adjacent gear faces materially increases static friction, which in turn reduces motor starting torque to an impractical value. An efficient gear motor should provide both high starting torque and high efficiency at operating speeds.

It is a primary object of my invention to provide, in combination with a pressure loaded motor of the gear type or other positive displacement rotary type, a pressure loading control device which permits the motor to start with little or no pressure loading, thereby reducing static friction and affording high motor starting torque, and which applies pressure loading to the sealing plate or bushing only after the motor has attained a reasonable operating speed, thereby providing high efficiency after the motor has performed its load starting task.

More specifically the invention provides a mechanism which drains fluid under high pressure from the pressure loading zone or chamber behind the sealing bushing until the motor has performed its load starting task, and which then automatically blocks further drainage of pressure fluid from such chamber as the motor approaches operating speed, thereby affording a build up of pressure in the chamber to urge the sealing bushing or plate into sealing engagement with the rotating gear faces. In one modified form of the invention as herein disclosed, a somewhat differently operating mechanism is provided which blocks the pressure loading zone altogether from the high pressure until the motor has performed its load starting task, and which then automatically introduces the high pressure and at the same time blocks a fluid return connection otherwise continuously effective to drain the pressure loading zone.

Other objects of the invention will be apparent when the following description is read in connection with the accompanying drawing, in which.

To simplify the description of this invention it is shown and described herein in a pressure loaded gear motor of the type shown and described in U.S. Patent No. 2,809,592 issued to Miller et al. It will be apparent that the present invention is applicable as well to other rotary types of pressure loaded fluid motors.

Figure 1:
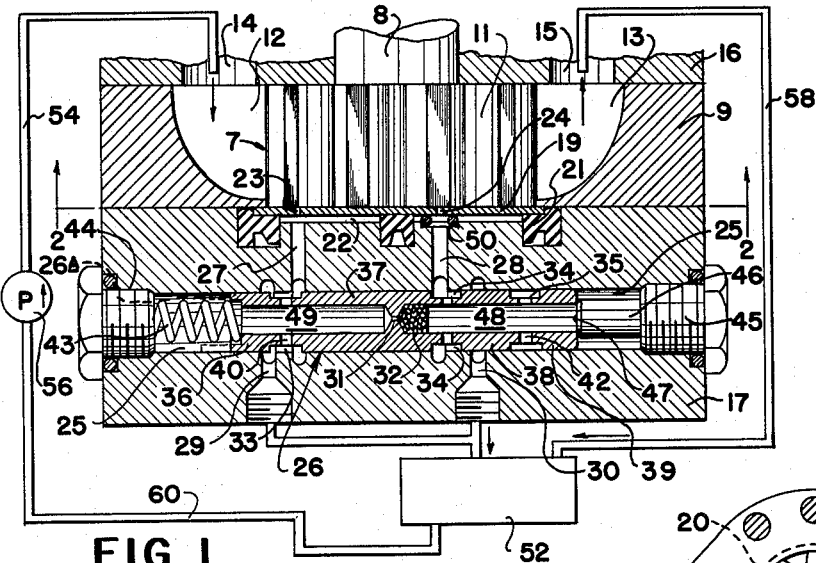
FIG. 1 is a transverse sectional view of a pressure loaded gear pump associated with my invention for delaying the pressure loading of the pump, also shown in section.

In the drawing FIG. 1 illustrates a portion of a motor having a sectional housing with the usual gear or rotor chamber 7 therein. The main body section 9 houses gears 10 and 11 within said chamber, and together with the gears defines a high pressure fluid inlet passage 12 (FIG. 2) and a low pressure fluid discharge chamber 13, which communicates respectively with the fluid inlet and outlet ducts 14 and 15. The gears 10 and 11 are made fast to parallel shafts, of which the shaft 8 constitutes the driven output shaft of the motor carrying the gear 11.

End sections or plates 16 and 17 close and seal against the opposite ends of the body 10, and the entire assembly is held together by a plurality of bolts 18.

Figure 2:
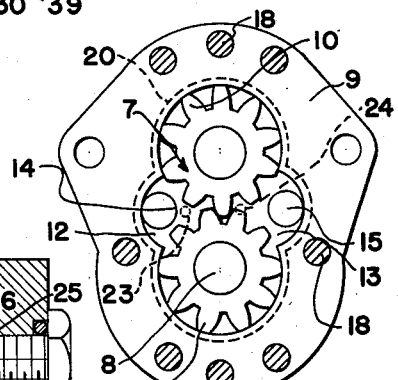
FIG. 2 is a vertical sectional view of the pump taken along the line 2—2 of FIG. 1, with parts shown in broken lines to indicate relative assembled positions thereof.

An axially movable sealing bushing or plate 19 is sandwiched between the body 9 and the end plate 17. Its general configuration is indicated by the broken line 20 in FIG. 2. The marginal edge of the plate is sealed by a gasket 21. A pressure loading zone or chamber 22 is defined between plate 19 and the adjacent recessed surface portion of end plate 17. During motor operation plate 19 is urged axially into sealing contact with the faces of the gears by fluid under inlet pressure introduced into chamber 22 through an orifice 23 in plate 19. Quantity flow of pressure fluid into chamber 22 is limited by the small size of the orifice. In FIG. 2, the phantom lines 23 indicate the relative location of orifice 23 with respect to inlet chamber 12.

An additional somewhat larger port or orifice 24 is provided in plate 19 in the location indicated by phantom lines 24 in FIG. 2, in the vicinity where oil is trapped between the meshing teeth of the gears during motor operation. Port 24 permits escape of this trapped fluid, and thus serves as a substitute for a conventional trap relief.

End plate or housing section 17 serves as a housing for a pressure differential actuated spool or plunger type valve. Section 17 is provided with a spool bore 25 which slidably receives a valve spool 26. An axial duct 27 affords communication between one side of the chamber 22 and the bore 25; the port 23 affords communication between the other side of the chamber 22 and the high pressure inlet chamber 12. Another axial duct 28 affords communication between the bore 25 and the low pressure chamber 13 through the port 24. Port 24 and the adjacent end of duct 28 are sealed off from chamber 22 by means of a compressible O-ring gasket 50. Drain ducts 29 and 30 communicate at their inner ends with bore 25, and their respective outer ends communicate with a low pressure chamber of the motor or, as illustrated, directly with the system reservoir 52.

The end plate 16 contains the inlet 14 which communicates with a conduit 54 to receive a liquid supply from a fluid pump 56. The outlet 15 defined in the end plate 16 communicates through a conduit 58 with the reservoir 52. A conduit 60 connects the pump intake and the reservoir 52.

Spool 26 has a through bore the fluid flow through which is restricted by a metering orifice 31. A fluid filter 32 is preferably provided in the spool bore adjacent this orifice. The external surface of spool 26 is provided with spaced annular grooves 33, 34 and 35 which separate lands 36, 37, 38 and 39. Transverse ports 40, 41 and 42 afford communication between the bore in the spool and the respective external grooves 33, 34 and 35.

Spool 26 is urged toward the right in FIG. 1 by a compression spring 43 seated in the adjacent end of the spool and also bearing against a threaded plug 44 sealing one end of spool bore 25. Movement of spool 26 to the right is selectively limited by a plug 45 having an integral coaxial shank which serves as a limit stop 46. A cross slot 47 in the adjacent end of spool 26 affords open communication between the bore in the spool and the adjacent portion of the bore 25, even when the end of the spool is seated on the limit stop 46.

Spool 26 occupies the position shown in FIG. 1 when the motor is inoperative. As the gears 10 and 11 start to rotate due to the introduction of pressure fluid into chamber 12 through inlet 14, that portion of the motive fluid which enters chamber 22 through orifice 23 is drained off through duct 27, spool groove 33 and duct 29. Sealing pressure against plate 19 is thus relieved, and the motor starts without the normal plate created static friction.

As the rotation speed of the gears increases fluid trapped between their meshing teeth in the low pressure chamber 13 is drained off through orifice 24, duct 28, port 41, into chamber 48, through filter 32 and orifice 31, chamber 49, port 40 and duct 29. The flow through restrictive orifice 31 in the direction of chamber 49 creates a pressure drop. This pressure drop results in a higher pressure in chamber 48 than in chamber 49, and as the gears approach operational speed this pressure differential forces spool 26 into the dotted line position 26a toward the left compressing spring 43, until spool land 37 closes the duct 27 and blocks the drainage of fluid from pressure sealing chamber 22. Pressure thus builds up in chamber 22 and urges sealing plate 19 into sealing contact with the faces of the rotating gears. This sealing pressure decreases axial operating clearances and materially increases the volumetric efficiency of the motor after it has performed its load starting task.

High motor starting torque is thus achieved by delaying the effectiveness of the pressure sealing feature until the gears reach sufficient rotational speed to eliminate the effects of static friction from the operating torque.

Figure 3:
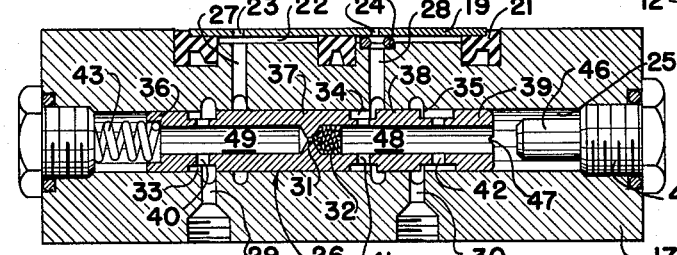
FIG. 3 is a view similar to FIG. 1, but shows the valve spool in the position it occupies during operation of the pump at running speeds.

As the motor reaches full operating speed the quantity of gear trapped fluid being forced through orifices 24 and 31 increases, which further increases the pressure differential between chambers 48 and 49. As a result spool 26 is forced to move into a second position farther to the left as shown in FIG. 3. Spool groove 35 now communicates with drain duct 30. The excess of fluid trapped between the gear teeth in chamber 13, which is being pumped through port 24, may now pass not only through orifice 31 but may also pass from chamber 48 through port 42 and out through drain duct 30. Therefore the pressure of the trapped oil pumped into chamber 48 never exceeds the small pressure required to move the spool to the FIG. 3 position against the compression of spring 43, and the pressure of the gear trapped fluid is easily relieved.

Figure 4:
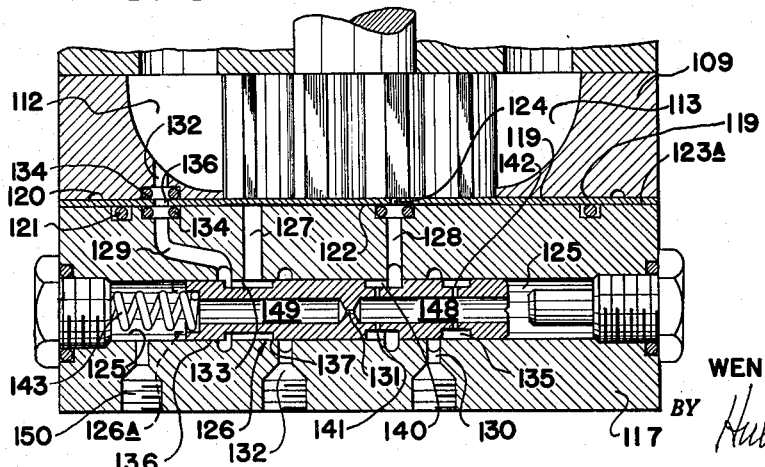
FIG. 4 is a view similar to FIG. 1, but showing a modification of the invention.

In the modification of FIG. 4, a pressure plate 119 of full width and of full length is shown which is secured between the motor body 109 and the end plate 117. The pressure loading zone occurring between the plates 119 and 117 is indicated by the heavy line 122; the thickness of this zone is hardly perceptible if at all because in actual practice the end plate is machined off flush so that the line 122 is in the plane of the end surface 123A of the end plate 117.

The operation due to the loading zone 122 is the same as in the preceding embodiment, except that loading pressure applied therein against the sealing plate 119 causes it to deflect axially at its midportion rather than for the entire plate to undergo axial movement. A gasket or O-ring 121 seals the plate 119 at one side to the end plate 117 and a continuous drain groove 120 formed in the body 109 at the other side of the plate 123 prevents leakage externally from that side of the motor.

In FIG. 4, a spool valve 126 within the spool bore 125 has a neutral or unmoved position (not shown) in which zone 122 is drained through duct 127 spool groove 133 and duct 132. There is negligible fluid flow since the orifice 23 of FIGS. 1, 2 and 3 has been omitted. Sealing pressure against plate 119 is thus relieved, and the motor starts without the normal plate created static friction.

As the rotation speed of the gears increases fluid trapped between the meshing teeth in the low pressure chamber 113 is drained off through orifice 124, duct 128, groove 140, ports 141 into chamber 148, orifice 131, chamber 149 and duct 150. The flow through restrictive orifice 131 in the direction of chamber 149 creates a pressure drop. This pressure drop results in a higher pressure in chamber 148 than 149, and as the gears approach operational speed this pressure differential forces spool 126 into the position shown in FIG. 4 so that spool land 137 closes off communication between duct 127 and duct 132 and opens communication between zone 122, duct 127, groove 133, duct 129, duct 132 and fluid inlet passage 112. Therefore full inlet pressure is supplied to zone 122 urging sealing plate 119 into sealing contact with the faces of the rotating gears achieving the high running volumetric efficiency and high starting torque previously described.

As the motor reaches full operating speed the quantity of gear trapped fluid being forced through orifices 124 and 131 increases, which further increases the pressure differential between chambers 148 and 149. As a result spool 126 is forced to move to a second position farther to the left as shown by the dotted lines 126A. Spool groove 135 now communicates with drain duct 130. Fluid trapped between the gear teeth in chamber 113 continues being pumped through orifice 131 to the extent of its capacity and the excess quantity is diverted from chamber 148 through port 142 and out through drain duct 130. Therefore, the pressure of the trapped oil pumped into chamber 148 never exceeds the small pressure required to move the spool to the position shown by the dotted lines against the compression of spring 143, and the pressure of the gear trapped fluid is easily relieved.

It will be understood that a sealing pressure control device embodying my invention, as described, can be effectively associated with any gear fluid motor, whether or not the device is housed in a section of the motor housing. By fluid as used herein is meant liquids and primarily hydraulic fluid, although the sealing principles hereof and high starting torque characteristics are applicable when using non-oily liquids as well as other motive fluids in general.

Having described the invention with sufficient clarity to enable those familiar with this art to construct and use it, I claim:

1. In a fluid motor which includes a housing defining a gear chamber, a pair of gears therein presenting meshing teeth, inlet means and an outlet connected to said chamber at opposite sides of said gears respectively, the improvement comprising the combination of a gear face sealing plate between the housing and the adjacent end faces of said gears and defining with the housing a pressure loading zone; means affording restricted communication between said inlet means and said pressure loading zone; and control means connected to the outlet side of the gear chamber effective to control the pressure in said pressure loading zone in response to variations in the volume of fluid trapped between the meshing teeth of said gears in the outlet side of said gear chamber during motor starting and operation.

2. The combination according to claim 1 in which the control means includes a structure defined flow path connected to that zone in the outlet side of the gear chamber in which fluid is trapped between the gear teeth and also connected to a fluid return port; and means interposed in said flow path between the said zone and the return port for restricting the volume flow of fluid from the former into the latter.

3. The combination according to claim 1 in which the control means includes: fluid return means; duct means connecting said return means with that zone in the outlet side of the gear chamber in which fluid is trapped between the gear teeth; duct means connecting the pressure loading zone with the return means; and means interposed between the return means, both duct means, and movable in response to the volume of fluid trapped between the gear teeth to vary the flow of fluid from both said duct means into said return means.

4. In a fluid motor which includes an end plate, a housing to which the end plate is secured and defining a gear chamber, a pair of gears with meshing teeth arranged to rotate in said chamber adjacent said end plate, fluid inlet means communicating with the chamber on one side of gears, fluid outlet means communicating with the chamber on the other side of said gears, and a pressure sealing plate between the adjacent end faces of said gears and the end plate and defining with said end plate a pressure loading zone to urge the sealing plate into forced sealing contact with the end faces of the gears, the improvement comprising the combination of: a pressure responsive valve; separate ducts connecting the valve with the pressure loading zone, and with that zone in the outlet side of the gear chamber in which fluid is trapped between the meshing teeth of the gears as they rotate, and with fluid return means; said valve being effective in a neutral position to afford restricted flow of fluid from the trapped fluid zone in the gear chamber to the return means and simultaneous free flow from the pressure loading zone to the return means, said valve being progressively effective as it moves toward a second position to block the flow of fluid from the pressure loading zone and to afford an increased flow of the trapped fluid zone to said return means, the movement of said valve from its neutral position toward and into said second position being in response to an increased volume flow of gear tooth trapped fluid into the valve as the rotational speed of the gears approaches normal operating speed.

5. In a fluid motor which includes an end plate, a housing to which the end plate is secured and defining a gear chamber, a pair of gears with meshing teeth rotatable in said chamber, fluid inlet means communicating with a high pressure side of said gears in said chamber, fluid outlet means communicating with the chamber on the other side of said gears, and a pressure sealing plate between said end plate and the adjacent end faces of said gears and defining with said end plate a pressure loading zone into which fluid under pressure may be introduced to force the pressure plate into flat sealing engagement with the adjacent end faces of the gears, the improvement which comprises: a flow responsive valve; separate ducts connecting the valve with the pressure loading zone, with that zone in the outlet side of the gear chamber in which fluid is trapped between the meshing teeth of the gears as they rotate, with the fluid inlet means, and with fluid return means; said valve being effective in a first position to afford restricted flow of fluid from the trapped fluid zone in the gear chamber to the return means and simultaneous free flow from the pressure loading zone to the return means, said valve being effective in a second position to afford an increased flow from the trapped fluid zone to said return means, to block the flow of fluid from the pressure loading zone to the return means, and to afford flow of fluid from the fluid inlet means to said pressure loading zone in response to an increased flow of fluid of gear-tooth trapped fluid into said valve.

6. In a fluid motor which includes a housing defining a gear chamber, a pair of gears with meshing teeth arranged to rotate in said chamber, fluid inlet means communicating with the chamber on the high pressure inlet side of said gears, fluid outlet means communicating with the chamber on the other side of said gears, an end plate secured to the housing in confronting relation to one set of end faces of said gears, and a pressure sealing plate between the adjacent end faces of said gears and said end plate and defining with the latter a pressure loading zone into which fluid under pressure may be introduced to urge the plate into forced sealing engagement with the adjacent end faces of the gears, the improvement which comprises: a valve body having a closed-ended spool bore therein; fluid return means consisting of fluid return ports spaced apart longitudinally along said bore and communicating therewith; a pair of ducts similarly spaced apart along said bore and communicating therewith, one duct also communicating with the pressure loading zone and the other duct communicating with that zone in the outlet side of the gear chamber in which fluid is trapped between the teeth of the gears as they rotate; a spool valve movable longitudinally in said bore and having spaced exterior lands and grooves thereon, and have a valve bore with open ends, said spool valve formed with an internal flow restricting orifice in an interposed position therein connecting the opposite ends of said valve bore and further formed with ports disposed at points on the spool valve connecting the valve bore with grooves at those points, said valve being effective in a first position to afford restricted flow of fluid from the trapped fluid zone in the gear chamber and free flow from the pressure loading zone into a fluid return port, and effective in a second position to block escape of fluid from the pressure loading zone and to afford a less restricted flow of fluid from the trapped fluid zone into a return port, the movement of said spool valve from its first position toward the second position being in response to an increased volume of fluid trapped between the gear teeth in the mentioned trapped fluid zone as rotational speed of the gears approaches normal operating speed.

7. In a fluid motor which includes a housing defining a gear chamber, a pair of meshing gears rotatable therein, fluid inlet means communicating with the chamber on the high pressure side of said gears, fluid outlet means communicating with the chamber on the other side of said gears, an end plate carried by said housing in confronting relation to the end faces of said gears, and a pressure sealing plate secured to the housing between said end plate and the adjacent end faces of said gears and defining with said end plate a pressure loading zone to which fluid under pressure may be introduced to urge the plate into forced sealing engagement with the adjacent end faces of the gears, the improvement which comprises: a valve body having a closed-ended spool bore therein, fluid return means consisting of fluid return ports spaced longitudinally apart along said bore and communicating therewith; ducts likewise spaced apart along said bore, said ducts communicating with said bore and consisting of first, second and third ducts, said first duct also communicating with the pressure loading zone, said second duct also communicating with the fluid trapped zone in the outlet side of the gear chamber in which fluid is trapped between the teeth of the meshing gears as they rotate, said third duct also communicating with the fluid inlet means; a spool valve movable longitudinally in said bore and having spaced exterior lands and grooves thereon, and having a valve bore with open ends, said valve formed with an internal flow restricting orifice in an interposed position therein connecting the opposite ends of said valve bore, and further formed with ports disposed at points on the valve connecting the valve bore with the grooves at those points, said valve being effective in a first position to afford restricted flow of fluid from the trapped fluid zone in the gear chamber and free flow from the pressure loading zone into a fluid return port, said valve being progressively effective upon predetermined initial movement from said first position to continue affording restricted flow of fluid from the trapped fluid zone into a fluid return port and to afford flow from the fluid inlet means to the pressure loading zone, and upon further movement from said first position to afford a less restricted flow of fluid from said trapped fluid zone into the return ports and to maintain flow from the fluid inlet means to the pressure loading zone, the progressive movement aforesaid of said valve being in response to an increased volume of fluid trapped between the teeth of the meshing gears in the fluid trapped zone as rotational speed of the gears approaches normal operating speed.

8. In a fluid motor which includes a housing defining a gear chamber, a pair of meshing gears rotatable therein, fluid inlet means communicating with the chamber on the high pressure side of said gears, fluid outlet means communicating with the chamber on the other side of said gears, an end plate secured to said housing in a position whereby the end faces of said gears are adjacent said end plate, and a pressure sealing plate between the end plate and the adjacent faces of the gears and defining with the end plate a pressure loading zone into which fluid under pressure may be introduced to force the pressure sealing plate into flat sealing engagement with the adjacent end faces of the gears, said pressure sealing plate having a flow restricting orifice therein affording flow of pressure fluid from the high pressure inlet side of the gear chamber to the pressure loading zone, the improvement which comprises: a first duct in communication with the pressure loading zone for bleeding fluid therefrom at a rate at least as great as fluid enters the chamber through said orifice; a second duct in communication with the fluid trapped zone in the outlet side of said chamber in which fluid is trapped between the teeth of the meshing gears as they rotate, for draining off gear-tooth trapped fluid from said fluid trap zone; fluid return means in communication with both said ducts; and valve means interposed between the fluid return means and both said ducts for controlling the flow of fluid from both ducts into said return means, said valve being effective to afford free flow of fluid from the first duct to the return means and restricted flow from the second duct to the return means in response to a relatively small volume flow of fluid through said second duct, and effective to block fluid flow from the first duct to the return means and afford a less restricted flow from the second duct to the return means in response to a relatively larger volume flow from the fluid trapped zone through said second duct.

References Cited in the file of this patent
UNITED STATES PATENTS

| | | |
|---|---|---|
| 2,915,977 | Campbell | Dec. 8, 1959 |
| 2,967,487 | Nagely | Jan. 10, 1961 |
| 3,050,010 | Thrap et al. | Aug. 21, 1962 |